United States Patent [19]

Kotzur et al.

[11] Patent Number: 4,851,744
[45] Date of Patent: Jul. 25, 1989

[54] FEEDBACK CIRCUITRY FOR D.C. MOTOR SPEED CONTROL

[75] Inventors: Frank W. Kotzur, Mahopac; Thomas H. Rosenkranz, N. White Plains, both of N.Y.

[73] Assignee: Windings, Inc., Goldens Bridge, N.Y.

[21] Appl. No.: 35,875

[22] Filed: Apr. 8, 1987

[51] Int. Cl.⁴ ............................................. H02P 5/16
[52] U.S. Cl. .................................... 388/815; 388/901; 388/907; 388/910; 388/917; 388/921
[58] Field of Search ..................... 318/306, 308–311, 318/314–315, 317–318, 329, 331, 339, 345 R, 345 A, 345 C, 345, 66–71

[56] References Cited

U.S. PATENT DOCUMENTS

| | | | |
|---|---|---|---|
| 3,553,551 | 5/1969 | Arnold | 318/318 |
| 3,950,682 | 4/1976 | Dohanich, Jr. | 318/314 |
| 4,096,422 | 6/1978 | Fleming et al. | 318/314 |
| 4,153,863 | 5/1979 | Schachte et al. | 318/341 |
| 4,288,729 | 9/1981 | Anzai et al. | 318/315 C |
| 4,390,826 | 6/1983 | Erdman et al. | 318/345 R |
| 4,586,121 | 4/1986 | Gilliam | 363/87 |
| 4,636,935 | 1/1987 | Tschernenko et al. | 318/345 R |

Primary Examiner—William M. Shoop, Jr.
Assistant Examiner—David Martin
Attorney, Agent, or Firm—Watson Cole Grindle & Watson

[57] ABSTRACT

A circuit for controlling the speed of a DC motor provides delay and sampling means in the feedback loop to delay the triggering of the SCRs driving the DC motor and measured the motor armature voltage during the period of the delay, thereby eliminating errors in the armature motor voltage caused by the SCR motor excitation.

Alternatively, the current to the motor is measured to generate a pulse output for initiating an interval during which the measured armature voltage is sampled and transmitted to a summator for generating an error signal controlling application of power to the DC motor whereupon the aforesaid interval is terminated upon receiving a pulse indicative of power application to the DC motor.

7 Claims, 2 Drawing Sheets

4,851,744

FEEDBACK CIRCUITRY FOR D.C. MOTOR SPEED CONTROL

BACKGROUND OF THE INVENTION

1. Field of the Invention

This invention relates to the speed control of D.C. motors, and more particularly to such speed control using a feedback signal representative of the D.C. motor armature voltage for generating an error signal indicative of the error in the motor speed wherein the motor armature voltage is accurately measured during a time interval in which the motor excitation is delayed or alternatively sampled at an optimum time.

2. Prior Art

U.S. Pat. No. 3,553,551, Digital Speed Control Apparatus issued to Arnold discloses the application of pulses, the frequency of which are representative of the motor velocity, to both a variable time delay circuit and to a switching circuit. A predetermined time delay is used, the length of which corresponds to the time between the pulses of a pulse train representative of the correct motor speed. The delayed feedback pulse train is compared with that of the measured pulse train. The motor is then caused to either speed up or slow down in dependence upon which of the pulses is first sensed. U.S. Pat. No. 3,950,682, Digital DC Motor Velocity Control System, issued to Dohanich, Jr. utilizes a delay to ensure that a counter has had time to respond to a feedback signal, the period of which represents velocity. The motor pulse drive width is adjusted to maintain a constant motor speed.

U.S. Pat. No. 4,288,729, Control System for DC Electric Motor, issued to Anazi et al, discloses a time delay for opening a switching circuit controlling the energization of the motor to eliminate noise components in the power input to the motor. The time delay is preferably approximately one-fourth of the natural oscillation period of the system.

FIG. 1 shows a known typical feedback control loop for controlling the speed of a DC motor. In such a typical feedback control loop the motor armature voltage is compared to a reference voltage representing the desired speed of motor 10 in summator or comparator 12. The error signal E is amplified by amplifier 14 and power amplifier 16, the latter including an SCR controlled power circuit and the necessary firing circuits therefor. Typical waveforms of the SCR drive circuit representing rotation of the DC motor and a stalled DC motor are respectively illustrated in FIGS. 2a and 2b. The complex waveform shown in FIG. 2a is the armature voltage signal that is fed back to the summator 12 of FIG. 1. The only region in the FIG. 2a that shows the actual motor speed is region f. However, it is readily apparent that the average voltage is somewhat higher than the actual voltage produced by the motor armature. Even in FIG. 2b, where the DC motor is stalled, it is apparent that the armature voltage is not zero due to the presence of the SCR pulse excitation signals. The aforementioned voltage errors cause errors in the speed of the DC motor from the desired speed as represented by the reference voltage at summator 12.

One known method of overcoming the foregoing problem is to use a separate tachometer/generator 18 shown in phantom lines in FIG. 1. However, such a tachometer/generator adds cost along with the benefits it provides in DC motor speed regulation.

SUMMARY OF THE INVENTION

The primary object of the invention is to provide an accurate signal representative of the speed of a DC motor without the necessity of special sensing transducers such as tachometer/generators.

Another object of the invention is to provide accurate measurement of the speed of a DC motor at least equivalent to that obtained by tachometer/generator type feedback control systems.

Yet a further object of the invention is to provide delay and sampling circuitry enabling modification of the feedback loop for existing DC motor speed control systems.

The modified feedback loop of one embodiment of the invention provides a delay to prevent motor excitation, such as the firing of SCR drivers, during which delay interval the armature motor voltage can be sampled to obtain an accurate measure of the true DC motor speed.

In accordance with that one embodiment of the invention the feedback loop for controlling the speed of a DC motor is modified to include delay and sampling circuitry which prevents, for example, an SCR power circuit from being actuated for a short interval such as 10 microseconds, and the generation of a sample pulse to measure the armature voltage of the DC motor and thereby obtain an accurate measurement of the true motor speed.

In another embodiment of the invention the current in the motor, the speed of which is being controlled, is monitored to determine the optimum time when the motor armature voltage can be accurately sampled.

The above features, advantages and objects of the present invention are readily apparent from the following description taken in conjunction with the above drawings representing a preferred embodiment of the best mode of carrying out the invention.

DETAILED DESCRIPTION OF THE PREFERRED EMBODIMENTS

Figure 1:
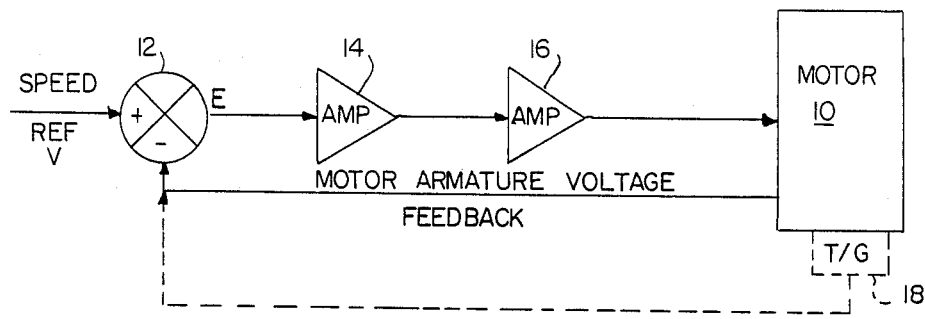
FIG. 1 illustrates a known prior art feedback control loop for regulating the speed of a DC motor.
Figure 2A:
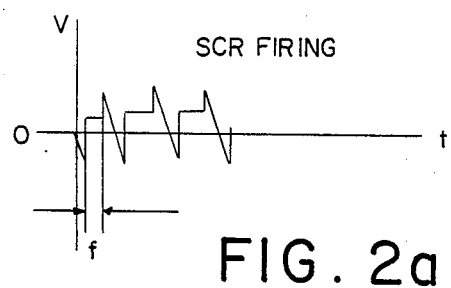
FIGS. 2a and 2b respectively show voltage waveforms for a running DC motor and a stalled DC motor.
Figure 2B:
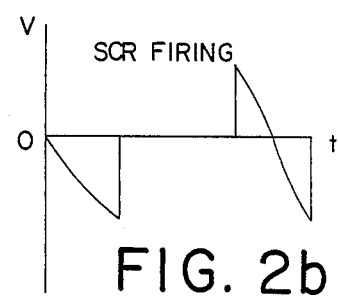
Figure 3:
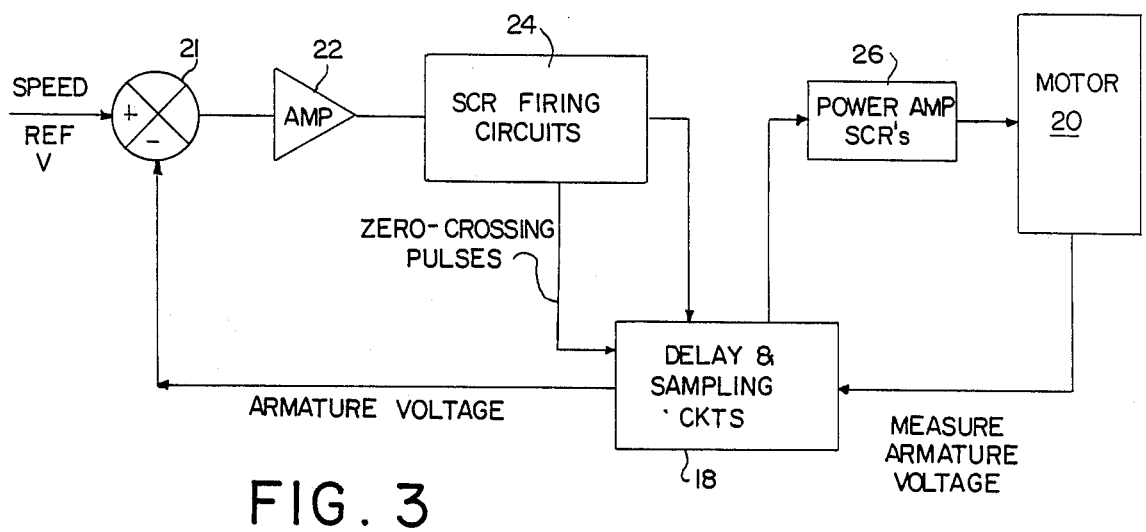
FIG. 3 is a block circuit diagram of the feedback speed control loop incorporating the delay feature of the present invention.

FIG. 3 illustrates a block diagram of the essential delay and sampling circuits of a first embodiment of the present invention and the manner in which they are included in a feedback loop for controlling the speed of a DC motor. In FIG. 3 the power amplifier 26 of the prior art speed control loop has been disassembled and the line that would normally fire or trigger the SCRs is routed to delaying and sample circuit 18. Delaying and sampling circuit 18 functions to prevent the SRCs in circuit 26 from being triggered for a short time, for example 10 microseconds. During that delay interval, delay and sampling circuit 18 generates a pulse to sample the armature voltage of motor 20. Because the SCRs in circuit 26 are OFF during the sample period, an accurate measurement of the true motor speed is obtainable because the DC motor armature voltage is proportional to motor speed since the DC motor produces its own voltage (acting as a generator) when its armature is rotating. Delay and sampling circuit 18 receives zero-crossing pulses from SCR firing circuit 24, and in turn provides a delayed triggering signal to SCR power circuit 26 for triggering the SCRs to drive the motor according to a desired speed represented by the reference voltage input to comparator or summator 21. Summator 21 generates an error signal E input to amplifier 22 as described previously with respect to the feedback speed control loop of FIG. 1.

Figure 4:
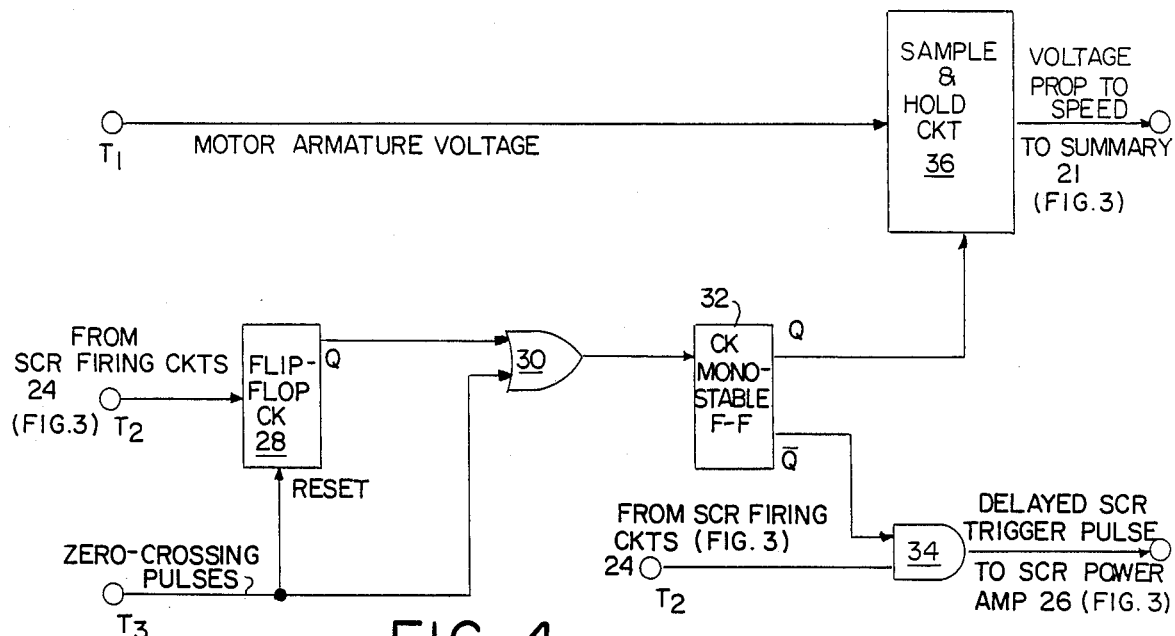
FIG. 4 is a schematic diagram of the delay circuitry of the present invention.

FIG. 4 represents an exemplary preferred embodiment of delay and sampling circuit 18 illustrated in FIG. 3. The DC motor armature voltage appears at terminal $T_1$. When a trigger pulse from SCR firing circuit 24 of FIG. 3 appears at terminal $T_2$, D-type flip-flop 28 is switched so that the Q output thereof is high. The Q output of flip-flop 28 passes through OR gate 30 to the clock input of monostable flip-flop 32 to open sample and hold circuit 36 thereby enabling a sampling of the motor armature voltage at terminal $T_1$. Thus the Q output of monostable flip-flop 32 has a pulse width equal to the desired sampling period and the delay in the firing of the SCR drivers in SCR drive circuit 24.

When monostable flip-flop 32 switches, the Q output goes high and the $\overline{Q}$ output goes low. After the delay, $\overline{Q}$ will return to a high state and Q will return to a low state. The transistion of $\overline{Q}$ from low to high is used to trigger the SCRs in the SCR power circuit of FIG. 3, and the delayed trigger pulse is delivered through AND gate 34. The zero-crossing pulses from SCR firing circuit 24 of FIG. 3 appear at terminal $T_3$ and perform the dual function of resetting D-type flip-flop 28 as well as to clock monostable flip-flop 32 through OR gate 30, which affords a sampling of the DC motor armature voltage in that case where a trigger pulse has not been received from terminal $T_2$. The trigger pulse might be absent if the input speed reference has been reduced and the DC motor is coasting down to a new speed. The zero-crossing signals at terminal $T_3$ reset the D-type flip-flop 28 at the start of a new power line cycle.

Figure 5:
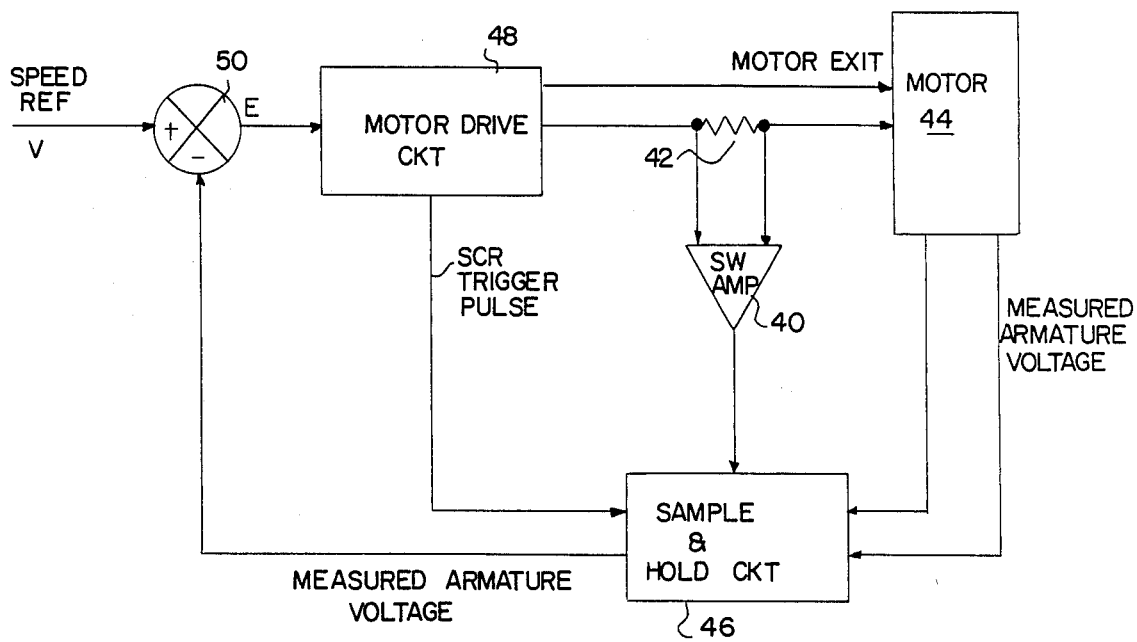
FIG. 5 shows another embodiment wherein the current to the motor is monitored to determine the optimum time when the motor armature voltage can be accurately sampled.

Another embodiment of the invention involves the monitoring of the motor current and then sampling the motor armature voltage at an optimum time as determined by the monitoring of the motor current as shown in FIG. 5. In this embodiment there is no delay as with the first embodiment, but the motor current is instead monitored, and when the motor current is substantially zero, a sample of the motor armature voltage is taken as the motor drive circuits are OFF.

In FIG. 5, if amplifier 40 measures the voltage across resistor 42, the voltage will be zero when the current through it (and motor 44) is zero. Amplifier 40 is designed to have a very high gain, such that it is effectively a switching amplifier, and thereby cause a sample of the voltage of motor 44 to be taken at that time by controlling sample and hold circuit 46. The gating can be terminated when the motor drive circuitry (not shown), including either SCRs or power transistors is again triggered. Thus, when switching amplifier 40 switches, sampling of the armature voltage of motor 44 can begin under control of sample and hold circuit 46. When the motor drive circuit 48 is again triggered as a result of the feedback control, for example as described, supra with respect to the embodiment of FIGS. 3 and 4, an SCR trigger signal from motor drive circuit 48 causes sample and hold circuit 46 to close, thereby preventing the measured armature voltage of motor 44 from being sampled and input to summator 50. Summator 50 receives a reference voltage to provide an error signal to motor drive circuit 48, which operates in a well known manner to control the excitation of motor 44 to control its speed.

From the above description it is apparent that either the delay and sampling circuit of the first embodiment, or the current monitoring and voltage sampling of the second embodiment, in the feedback control loop of a DC motor speed control circuit eliminates the presence of the effects of power to the DC motor, thereby obtaining a more accurate measurement of the armature voltage of the DC motor and its speed. Moreover, the enhanced armature voltage measurement is obtained by the use of well known, inexpensive circuitry which can be easily incorporated into the feedback loop of a DC motor speed control circuit.

Both the first and second embodiments of the invention are capable of being used with motor drive circuitry other than that incorporating SCRs. For example, a power amplifier using transistors in a pulse width modulated (PWM) system can be used with both embodiments of the invention. However, both embodiments require a period during the motor power cycle wherein the motor is not being excited.

The above embodiments of the invention have been described solely to illustrate the function and operation of the invention, and those skilled in the motor speed control art will recognize modifications of the invention as being equivalents of the components set forth in the appended claims, such that the invention is not to be limited to the particular embodiments described herein, but is to be accorded the equivalents of the claimed components.

What is claimed is:

1. A circuit for controlling the speed of a DC motor from a measured armature voltage and a reference voltage signal representing desired motor speed, comprising:
   means for comparing said measured armature voltage with said reference signal and generating an error signal;
   means for driving said motor;
   means responsive to said error signal to generate signals for triggering the excitation of said means for driving, and providing signals indicating the zero crossover of an AC power source providing power for said means for driving; and
   delay and sampling means responsive to said zero crossover signals and said triggering signals to delay the triggering of said means for driving and gating a signal representative of said armature voltage during the period of said delay.

2. The circuit as claimed in claim 1 wherein said delaying and sampling means includes means responsive to said triggering signals to generate pulse output having a pulse width defining said delay period.

3. The circuit as claimed in claim 1 wherein said delaying and sampling means includes means responsive to said triggering signals to generate pulse outputs including delayed trigger pulse outputs at the termination of said delay for triggering said means for driving.

4. The circuit as claimed in claim 3 wherein said means responsive to said triggering signals includes a flip-flop for receiving said triggering signals and providing at least a Q output and an OR gate for gating the Q output of said flip-flop, a monostable flip-flop receiving the output gated by said OR gate to generate Q and NOT Q outputs, said NOT Q output being said pulse output and an AND gate receiving said NOT Q output and said triggering signals to produce a delayed trigger pulse output.

5. The circuit as claimed in claim 4 wherein said OR gate also receives said zero-crossing signals to enable measurement of the armature motor voltage.

6. Circuitry for controlling the speed of a DC motor from measured armature voltage and a reference voltage representing desired motor speed, comprising:

means for comparing said measured armature voltage with said reference voltage and generating an error signal;

means responsive to said error signal for driving said motor and for providing a first pulse output indicative of the application of power to said motor;

means electrically connected between said motor driving means and said motor to measure the current provided to said motor and to generate a second pulse output representing a substantially zero current measurement; and sample and hold circuitry sequentially responsive to said second and first pulse outputs to receive and transmit signals representative of the measured armature voltage of said motor by the measuring means to said means for comparing only during the interval between said second and said first pulse outputs.

7. The circuitry as claimed in claim 6 wherein the means for measuring substantially zero current to said motor includes a resistance serially connected between said motor driving means and said motor and a amplifier responsive to the voltage across said resistance for generating said second pulse output.

* * * * *